CLARK MARSH, OF BRIDGEPORT, CONNECTICUT, ASSIGNOR TO THE NEW YORK BELTING AND PACKING COMPANY.

Letters Patent No. 88,725, dated April 6, 1869.

IMPROVED MODE OF FINISHING AND TRUING EMERY-WHEELS, &c.

The Schedule referred to in these Letters Patent and making part of the same.

*To whom it may concern:*

Be it known that I, CLARK MARSH, of Bridgeport, in the county of Fairfield, and State of Connecticut, have invented certain new and useful Improvements in the Manufacture of Vulcanite Emery-Wheels, or other like composition-wheels, or grindstones of artificial composition, relating particularly to the finishing and truing of the same; and I hereby declare the following to be a full, clear, and exact description thereof.

My invention has reference to composition-wheels, made of India rubber and emery, known as vulcanite emery-wheels, or to other like composition-wheels and grindstones.

These wheels, or stones, when first made or taken from the moulds, in which they are usually formed under a heavy pressure, are often rough on the surface, and it becomes necessary, therefore, to finish and "true" them; and so when they have been in use for some time, their faces become worn and uneven, and they must be again turned off in a lathe, and made true.

Owing, however, to the extreme hardness of these wheels, and especially those made of emery vulcanite, no steel tool can be made to cut them when in their ordinary condition. And whenever it becomes necessary to turn off in a lathe the face of an emery vulcanite-wheel, a bar of red-hot iron, or a small pan of lighted charcoal, or other suitable heating-agent, must be first placed just under the slowly-revolving wheel, so as to soften its surface before the common turning-tool can make any impression upon it.

This operation is not only necessarily slow and troublesome, but is liable to injure the wheel, and great care must be exercised to obtain just the right degree of heat, neither more nor less than is required to bring the surface of the wheel to the proper condition.

Some simple, effective, and quick mode of turning off or finishing and truing emery, vulcanite, and other like wheels, has long been a desideratum, and it is to the accomplishment of this object that my invention is directed.

After considerable experiment and study, I have found that such wheels can, without being subjected to any preliminary preparation or softening, be readily, easily, and quickly cut with a diamond.

I therefore form a tool, which has the ordinary or usual shape, so as to fit in the tool-rest of an engine-lathe, and is made in all respects like common turning-tools, save that its cutting-point is formed of one or more small black diamonds, firmly inserted and held in its end.

The tool is used in the same manner as a turning-tool in turning cast-iron, except that the wheel, being turned off, should revolve about twice as fast as is customary in truing metals, and be kept wet in order to keep down the dust and avoid heating the tool.

The wear upon the diamond point is scarcely perceptible, and with ordinary care it will last for several years.

By its use, the face and sides of an emery, vulcanite, or like wheel can be turned off, or cut into any shape with the same facility and in half the time that a soft-cast-iron wheel of the same size can be so treated, so that with little trouble, expense, or loss of time, and without danger of impairing its quality, the wheel can be finished and "trued," and kept in perfect condition so long as it remains large enough for use.

Having now described my invention, and the manner in which the same is or may be carried into effect,

What I claim, and desire to secure by Letters Patent, is—

The method of finishing and truing emery vulcanite-wheels, or other wheels and grindstones of artificial composition, substantially as and by the means aforesaid.

In testimony whereof, I have signed my name to this specification, before two subscribing witnesses.

CLARK MARSH.

Witnesses:
FREDERICK M. FOWLER,
F. M. GERON.